(12) United States Patent
Katsuta et al.

(10) Patent No.: US 8,181,933 B2
(45) Date of Patent: May 22, 2012

(54) PIPE JOINT

(75) Inventors: Koji Katsuta, Tsukubamirai (JP); Masayuki Okitsu, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 775 days.

(21) Appl. No.: 12/236,904

(22) Filed: Sep. 24, 2008

(65) Prior Publication Data

US 2009/0108227 A1 Apr. 30, 2009

(30) Foreign Application Priority Data

Oct. 31, 2007 (JP) .................................. 2007-283538
Apr. 21, 2008 (JP) .................................. 2008-109772

(51) Int. Cl.
*F16L 37/28* (2006.01)

(52) U.S. Cl. ................. 251/149.6; 251/149.1; 251/149.9

(58) Field of Classification Search .................. 251/149, 251/149.1, 149.6, 149.9
See application file for complete search history.

(56) References Cited

U.S. PATENT DOCUMENTS

| 3,177,018 A | | 4/1965 | Goodwin |
| 3,567,175 A | * | 3/1971 | Sciuto, Jr. .................. 251/149.6 |
| 5,423,515 A | | 6/1995 | Ozaki |
| 6,581,907 B1 | * | 6/2003 | Kuwabara et al. ......... 251/149.6 |

FOREIGN PATENT DOCUMENTS

| CN | 2573831 Y | 9/2003 |
| CN | 200943783 Y | 9/2007 |
| DE | 1425432 | 11/1968 |
| DE | 2016850 | 10/1971 |
| JP | 52-13518 | 1/1977 |
| JP | 58-41430 | 9/1983 |
| JP | 61-73993 | 5/1986 |
| JP | 2732017 | 12/1997 |

* cited by examiner

*Primary Examiner* — John Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

The present invention concerns a pipe joint, which includes a socket, and a plug arranged in confronting relation to the socket. A holder is disposed on one end of the socket. Further, a packing is retained between the socket and the holder. In addition, the packing is constructed from a body sealing portion disposed on an outer circumferential side thereof, a plug sealing portion disposed on an inner circumferential side thereof that abuts against an outer circumferential surface of the plug, and a valve sealing portion provided with a seating surface upon which a valve, which is disposed displaceably inside of the socket, can be seated.

9 Claims, 11 Drawing Sheets

PIPE JOINT

BACKGROUND OF THE INVENTION

1. Field of the Invention

The present invention relates to a pipe joint for opening and closing a flow passage through which a fluid flows, by connection and separation of a socket and a plug.

2. Description of the Related Art

Heretofore, when a socket and plug are connected to and separated from each other, a pipe joint has been utilized for automatically opening and closing a flow passage. By means of the pipe joint, since a valve body is caused to open and close automatically when the socket and plug are separated, the fluid flow passage is blocked and leakage of fluid is prevented.

For example, as shown in FIG. 10, in the pipe joint 1 disclosed in Japanese Patent No. 2732017, locking balls 2 are included on an outer circumferential part. The pipe joint 1 is equipped with a forward tubular portion 4 that slidably retains an operating sleeve 3 therein, and a rearward tubular portion 5 connected to a rear end part of the forward tubular portion 4. A socket body 6 is constructed from the forward tubular portion 4 and the rearward tubular portion 5. At the interior of the socket body 6, a valve mechanism 9 is provided. The valve mechanism 9 comprises a valve retaining member 7 which is formed with a cylindrical shape and a valve body 8 which is slidably inserted into the interior of the valve retaining member 7. A spring 10 is interposed between the valve body 8 and an end part of the valve retaining member 7, with the valve body 8 being biased by the spring 10 toward the side of the forward tubular portion 4. A first sealing ring 11 is mounted on an outer circumferential surface of the valve body 8. The first sealing ring 11 is capable of abutment against a valve seat 12, which is formed on the rearward tubular portion 5.

Further, a second sealing ring 13 is disposed between the rearward tubular portion 5 and the valve retaining member 7, and a third sealing ring 14, which is capable of keeping both members sealed in their retained state, is provided between the valve retaining member 7 and the valve body 8.

In addition, during a non-connected state of the forward tubular portion 4 with respect to the rearward tubular portion 5, the valve body 8 is advanced forward under a resilient action of the spring 10, whereupon the fluid passage 15 is blocked by abutment of the first sealing ring 11 against the valve seat 12. On the other hand, when the forward tubular portion 4 is connected, the front end of the forward tubular portion 4, which is inserted into the socket body 6, abuts against the end of the valve body 8, and the valve body 8, which is pressed by the forward tubular portion 4, is retracted in opposition to the elastic force of the spring 10. Additionally, through separation of the first sealing ring 11 away from the valve seat 12, the fluid passage 15 is opened and placed in a state of communication.

Further, as shown in FIGS. 11A and 11B, in the tube joint disclosed in Japanese Utility Model Publication No. 58-041430, a cylindrically shaped socket 20 is equipped with a valve body 22 therein, which is displaced under the resiliency of a compression spring 21. An end surface of the valve body 22 is disposed so as to be seatable on a valve seat 23 made of rubber, which is disposed on an inner wall surface of the socket 20. Additionally, a plug 24 is inserted from an end of the socket 20, wherein by the insertion of locking balls 25 provided in the socket 20 into an annular groove 26 of the plug 24, integral connection of the plug 24 and socket 20 is enabled.

Incidentally, in the conventional technique according to Japanese Patent No. 2732017, because first through third sealing rings 11, 13, 14 are provided respectively and individually, the number of parts making up the pipe joint 1 is increased, which leads to an increase in the number of assembly steps, as well as cost.

On the other hand, in the conventional technique according to Japanese Utility Model Publication No. 58-041430, when the plug 24 is inserted from an end of the socket 20, prior to abutment of the end of the plug 24 against the rubber valve seat 23, the valve body 22 is pressed by the plug 24 and separates away from the valve seat 23. Owing thereto, before sealing is carried out by the valve seat 23, the pressure fluid flows toward the side of the plug 24 from the socket 20, and as a result, pressure fluid tends to leak from between the socket 20 and the plug 24.

Moreover, with the plug 24 of the pipe joint, a structure is provided in which the plug 24 is inserted from the end of the socket 20, wherein a fluidtight condition is maintained between the socket 20 and the plug 24 by abutment against the valve seat 23. However, because an opposite reactive force is imposed with respect to the plug 24 from the valve seat 23 in a direction opposite to the direction of insertion thereof, resistance is encountered when the plug 24 is inserted, which makes the connection operation difficult.

Furthermore, at a time when the valve body 22 is seated, because a seating force is imparted with respect to the valve seat 23 from the valve body 22 in the same direction as the displacement direction of the valve body 22, resistance to pressure is reduced in the event that a high pressure is imparted with respect to the valve body 22.

Still further, since the valve body 22, which is utilized for switching the communication state of the pressure fluid, is arranged to cut across the fluid passage provided within the socket 20 and the plug 24, resistance is developed when the pressure fluid flows through the flow passage, accompanied by an increase in pressure loss.

SUMMARY OF THE INVENTION

An object of the present invention is to provide a pipe joint, in which the assembly thereof is improved together with enabling reductions in cost, and leakage of pressure fluid is prevented, while the pressure fluid can reliably be made to flow through the pipe joint.

The present invention is characterized by:

a first joint member;

a holder connected integrally with the first joint member;

a second joint member, which is connectably and detachably installed in an interior of the holder;

a valve mechanism disposed in an interior of the first joint member, the valve mechanism enabling switching of a flow state of a pressure fluid that flows between the first joint member and the second joint member; and a seal member having a first sealing portion retained between the first joint member and the holder, a second sealing portion which is capable of abutment against the second joint member, and a third sealing portion on which a valve body of the valve mechanism is seatable.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
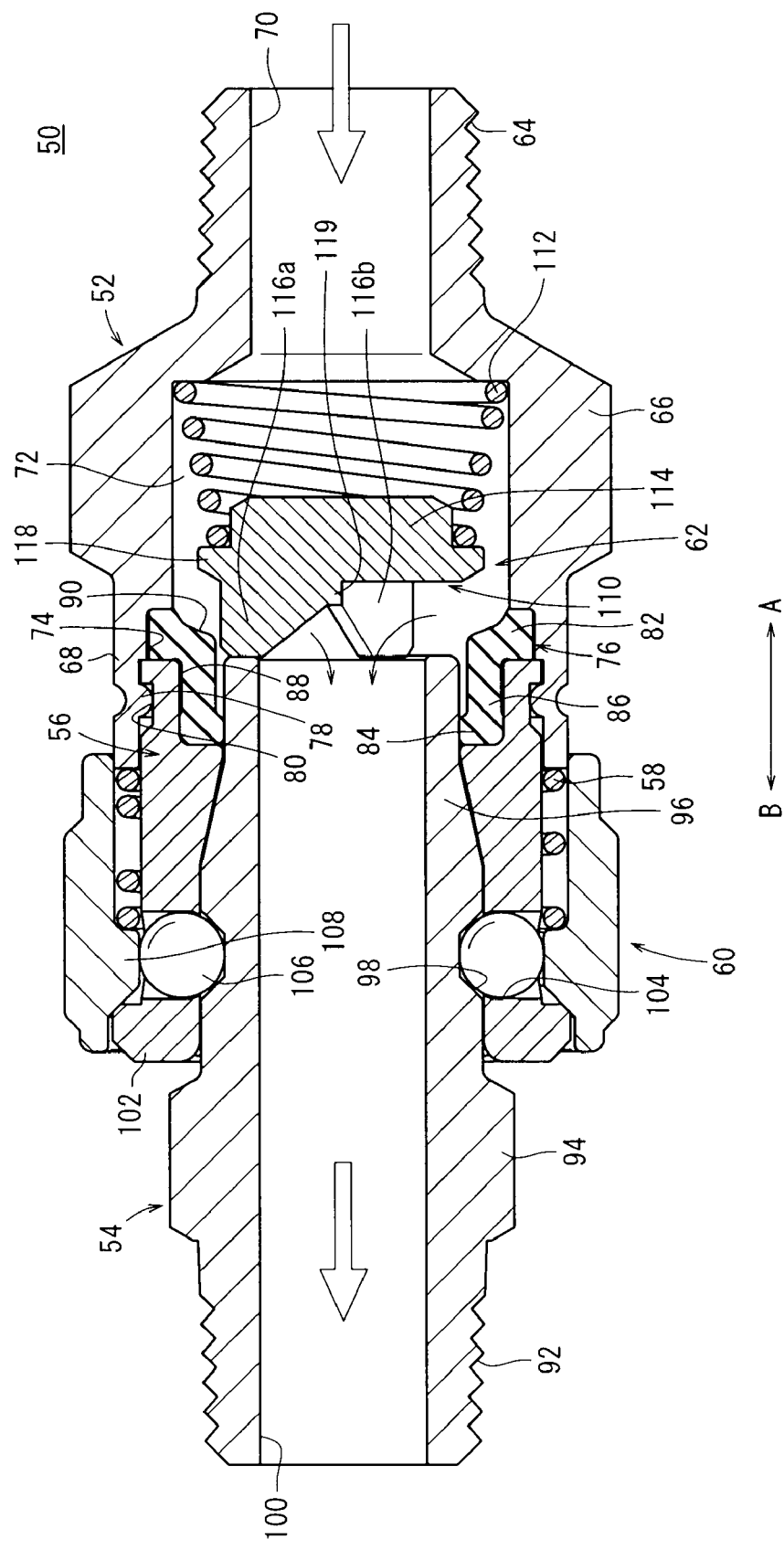
FIG. 1 is an overall vertical cross sectional view of a pipe joint according to a first embodiment of the present invention.
Figure 2:
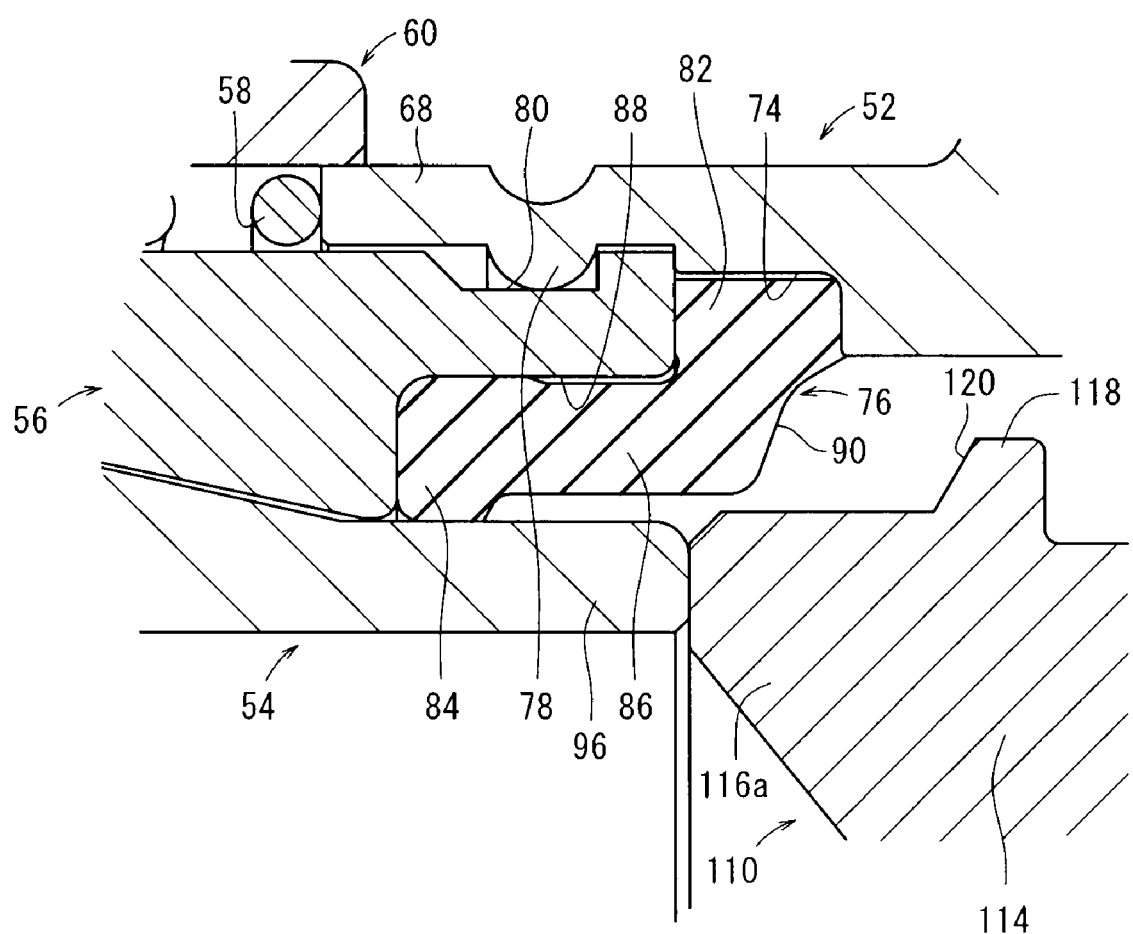
FIG. 2 is an enlarged cross sectional view showing the vicinity of a valve and packing in the pipe joint shown in FIG. 1.

In FIG. 1, reference numeral 50 indicates a pipe joint according to a first embodiment of the present invention. With reference to FIG. 1, a condition shall be explained in which a plug 54 is connected with respect to a socket 52.

As shown in FIGS. 1 through 7, the pipe joint 50 is equipped with a socket (first joint member) 52 made from a metallic material, which is arranged on one side (in the direction of the arrow A) along the axial direction, and a plug (second joint member) 54 arranged coaxially therewith on the other side (in the direction of the arrow B) so as to confront the socket 52. Further, the pipe joint 50 also includes a holder 56 disposed on an end of the socket 52 into which a portion of the plug 54 is inserted, a sleeve 60 mounted in surrounding relation to an outer circumferential surface of the holder 56 and which is displaceable in the axial direction under the elasticity of a return spring 58, and a valve mechanism 62 disposed in the interior of the socket 52 that switches the communication state between the socket 52 and the plug 54.

The socket 52 includes a first connector 64 formed on one end side thereof, which is connected to a non-illustrated pipe or the like, a hexagonal and columnar shaped first fastening member 66 disposed adjacent to the first connector 64, and a retaining member 68 formed on the other end side of the socket 52, which is capable of retaining the holder 56 therein.

Further, in the socket 52, a port 70 is formed in an interior part of the first connector 64, and a space 72, which is expanded in diameter radially outward with respect to the port 70, is provided at the interior of the first fastening member 66. The valve mechanism 62 is disposed in the space 72.

Moreover, a stepped portion 74, which is further expanded in diameter with respect to the space 72, is formed on an inner circumferential surface of the retaining member 68 constituting the socket 52. A portion of a packing (seal member) 76 is sandwiched and gripped between the stepped portion 74 and the holder 56.

Further, an annular protrusion 78 which projects outward in a radial direction is formed on the retaining member 68.

The holder 56 becomes connected with respect to the socket 52 through insertion of the protrusion 78 into a concave groove 80 of the holder 56 (to be described later).

The packing 76 is formed in a cylindrical shape from an elastic material such as rubber or the like, for example, and includes a body sealing portion (first sealing portion) 82 retained on the stepped portion 74, a plug sealing portion (second sealing portion) 84, which is reduced in diameter radially inward with respect to the body sealing portion 82, and a valve sealing portion (third sealing portion) 86 interconnecting the body sealing portion 82 and the plug sealing portion 84. The body sealing portion 82 is disposed at one end side of the packing 76 on the side of the socket 52, whereas the plug sealing portion 84 is disposed at another end side of the packing 76 on the side of the holder 56.

The valve sealing portion 86 is bent substantially in an L-shape in cross section, and extends at a substantially constant diameter along the axial direction, connecting the body sealing portion 82 and the plug sealing portion 84 integrally together. The outer circumferential surface thereof is installed onto a mounting portion 88, which is provided on an inner circumferential surface of the holder 56.

Further, the valve sealing portion 86 includes a seating surface 90, on which a valve 110 making up the valve mechanism 62 is capable of being seated, disposed in the vicinity of the body sealing portion 82. The seating surface 90 faces the valve 110 while being inclined at a predetermined angle with respect to the axis of the packing 76, and is formed in a tapered shape that gradually reduces in diameter in a direction from the body sealing portion 82 toward the plug sealing portion 84.

The plug 54 is formed in a cylindrical shape from a metal material, such that by insertion of a portion thereof into the holder 56 and the socket 52, the plug 54 is connected to the other end portion of the socket 52. The plug 54 is made up from a second connector 92 formed on one end side thereof and which is connected to a non-illustrated pipe or the like, a hexagonally shaped second fastening member 94 disposed adjacent to the second connector 92, an insert 96 formed on the other end side and which is reduced in diameter with respect to the second fastening member 94, and a ball groove 98 disposed between the second fastening member 94 and the insert 96, which is recessed in an annular form on an outer circumferential surface of the plug 54.

Further, a through hole 100 is formed inside the plug 54, which penetrates in the axial direction (the direction of arrows A and B), so that when the plug 54 is connected with respect to the socket 52, the port 70 and the space 72 are placed in communication.

The holder 56 is formed in a cylindrical shape from a metal material. One end part of the holder 56 on the side of the socket 52 is arranged to face toward the stepped portion 74 of the socket 52. The body sealing portion 82 of the packing 76 is gripped and retained between the end part of the holder 56 and the socket 52 at the stepped portion 74 of the socket 52.

Further, the concave groove 80 is disposed on one end side of the holder 56 along the outer circumferential surface thereof, with the protrusion 78 formed along the inner circumferential surface of the other end of the socket 52 being inserted therein. Owing thereto, the holder 56 is positioned in the axial direction with respect to the socket 52, resulting in a connected condition in which displacement thereof in the axial direction is regulated.

Furthermore, the mounting portion 88 is formed on the inner circumferential surface of the one end side of the holder 56, and is expanded in a radial outward direction. The valve sealing portion 86 and the plug sealing portion 84 of the packing 76 are attached to the mounting portion 88. On the other hand, the other end part of the holder 56 has a flange 102 which is expanded in a radial outward direction. A plurality of ball holes 104, which are separated from each other by predetermined distances along the circumferential direction, are provided in the vicinity of the flange 102. Plural balls 106 are inserted into the ball holes 104, respectively, to be displaceable in a radial direction of the holder 56. The diameters of the ball holes 104 on the inner circumferential side of the holder 56 are formed to be slightly smaller. Owing thereto, the balls 106 do not drop out from the ball holes 104 into the interior of the holder 56, and the balls 106 are retained inside of the ball holes 104.

Further, the inner circumferential surface of the holder 56 is formed so as to become reduced gradually in diameter from the other end side on the side of the plug 54 toward the one end side on the side of the socket 52. More specifically, the inside diameter of the holder 56 is set substantially constant from the other end to a substantially central portion along the axial direction, and to become gradually reduced in diameter from the central portion to the one end side thereof. That is, the inner circumferential surface of the holder 56 is formed with a shape that corresponds to the insert 96 of the plug 54, which is inserted into the interior thereof.

The sleeve 60 is formed in a cylindrical shape from a metal material and is disposed to cover the outer circumferential surface of the holder 56. A projecting portion 108 is formed, which projects in a radial inward direction, on the inner circumferential surface of the sleeve 60. A return spring 58, which urges the sleeve 60 in a direction away from the socket 52, is interposed between the projecting portion 108 and the other end of the socket 52. The projecting portion 108 is formed in an annular shape facing toward the ball holes 104 of the holder 56 and the balls 106 installed inside the ball holes 104, and is disposed so as to be capable of abutment against the outer circumferential surface of the balls 106.

Further, the return spring 58 is formed, for example, from a coil spring having a fixed diameter and a plurality of windings. The return spring 58 is disposed in the space between the inner circumferential surface of the sleeve 60 and the outer circumferential surface of the holder 56.

In addition, when the sleeve 60 is displaced by the elasticity of the return spring 58, the projecting portion 108 confronts the ball holes 104 of the holder 56 and the balls 106 installed inside the ball holes 104, and displacement of the sleeve 60 is regulated by abutment of the projecting portion 108 against a flange 102 of the holder 56. That is, the flange 102 of the holder 56 functions as a stopper mechanism, which is capable of regulating axial displacement of the sleeve 60.

The valve mechanism 62 includes the valve 110, which is disposed in the space 72 of the socket 52 and is displaceable along the axial direction of the socket 52, and a valve spring 112 interposed between the valve 110 and an inner wall surface of the space 72, the valve spring 112 urging the valve 110 toward the side of the plug 54 (in the direction of the arrow B).

Figure 3:
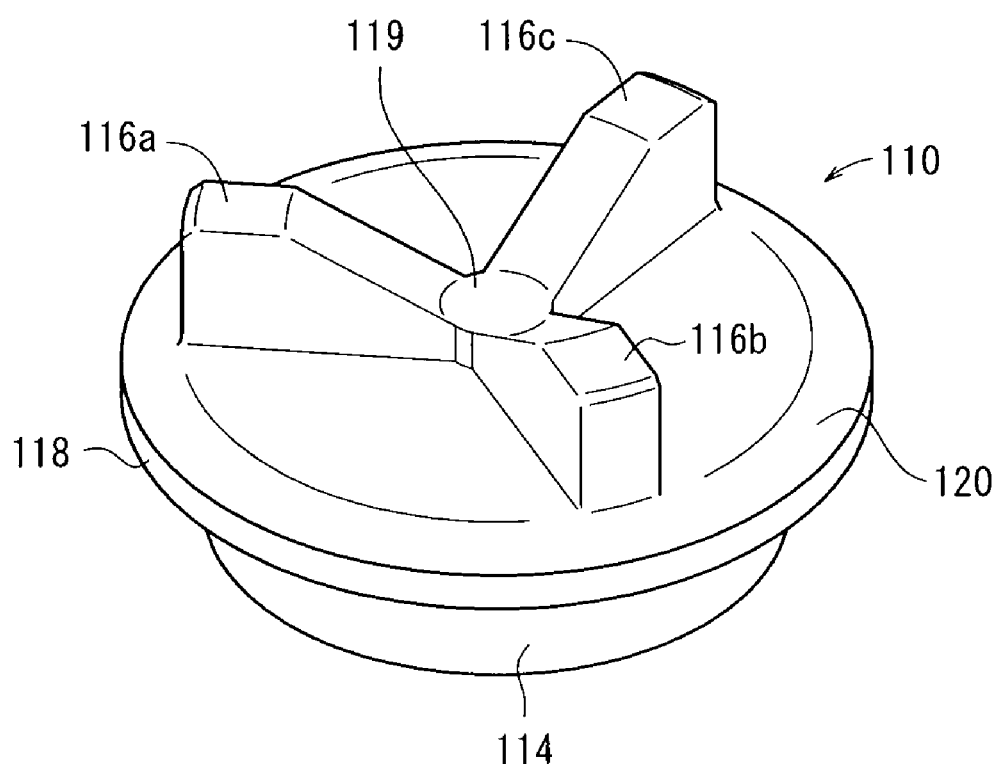
FIG. 3 is a simple perspective view of a valve making up the pipe joint of FIG. 1.
Figure 4:
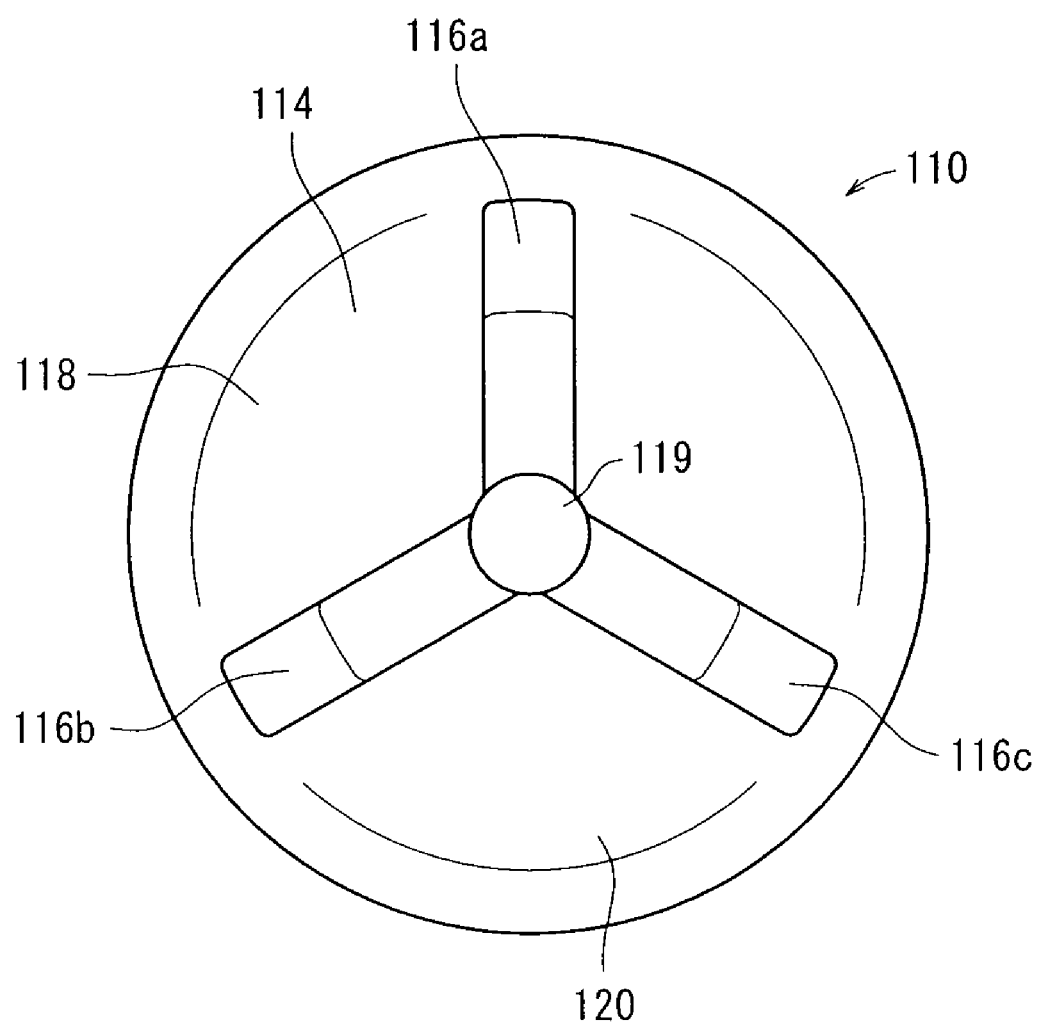
FIG. 4 is a frontal plan view of the valve shown in FIG. 3.

The valve 110, for example, is formed from a metal material, and as shown in FIGS. 3 and 4, includes a main body part 114, a plurality of legs 116a to 116c that project at a predetermined height with respect to an end surface of the main body part 114, and a seat member 118 that projects in a radial outward direction with respect to the main body part 114. On the main body part 114, an end surface facing the plug 54 and the packing 76 is formed in a flat shape that extends perpendicularly to the axis, and at the center thereof, a cylindrical columnar shaped base portion 119 is provided.

Three legs 116a to 116c are provided, for example, which are separated mutually about the base portion 119 at equal intervals, and extend radially outward therefrom in a radiating shape. In addition, the legs 116a to 116c are formed so as to become gradually greater in height from the side of the base portion 119. The height of the legs 116a to 116c is formed such that a location that abuts against the end of the plug 54 is formed at a fixed height. Stated otherwise, the legs 116a to 116c extend respectively from a peripheral edge at one end surface of the main body part 114 toward the center.

Further, the legs 116a to 116c are arranged such that the location thereof at an outer circumferential side of the main body part 114 has a diameter that is roughly the same as the other end of the plug 54, so that when the plug 54 is installed into the socket 52 and the holder 56, the other end is disposed for abutment against the front ends of the legs 116a to 116c. Stated otherwise, the legs 116a to 116c are formed in a columnar shape with respect to the main body part 114.

The seat member 118 is formed as a flange, which projects outwardly at a predetermined diameter with respect to the outer circumferential surface of the main body part 114, and a tapered surface 120 (see FIG. 2), which tapers gradually in a direction toward the legs 116a to 116c, is formed on an end surface thereof on the side of the plug 54 (in the direction of the arrow B). In addition, in a non-connected state of the plug 54 with respect to the socket 52, the tapered surface 120 assumes a valve closed state, in which the tapered surface 120 abuts against the seating surface 90 of the packing 76 (see FIG. 5). Further, the other end surface of the seat member 118 is formed in a flat shape, with one end of the valve spring 112 being affixed thereto.

On the other hand, the other end surface of the main body part 114 facing the port 70 of the socket 52 is formed with a rectangular shape in cross section, with the outer peripheral sides thereof being inserted through the valve spring 112.

The valve spring 112 is made up from a coil spring, for example. One end of the valve spring 112 is installed onto the valve seat member 118 of the valve 110, whereas the other end thereof is installed on an inner wall surface, at a connection location between the space 72 and the port 70 that make up the socket 52. The valve spring 112 is formed with a tapering shape in cross section, which expands in diameter gradually from one end thereof on the side of the valve 110 toward the other end of the valve spring 112.

The pipe joint 50 according to the first embodiment of the present invention is basically constructed as described above. Next, operations and effects of the invention shall be explained. In this regard, the non-connected state shown in FIG. 5, in which the plug 54 is separated from the socket 52, shall be described as an initial condition.

Figure 5:
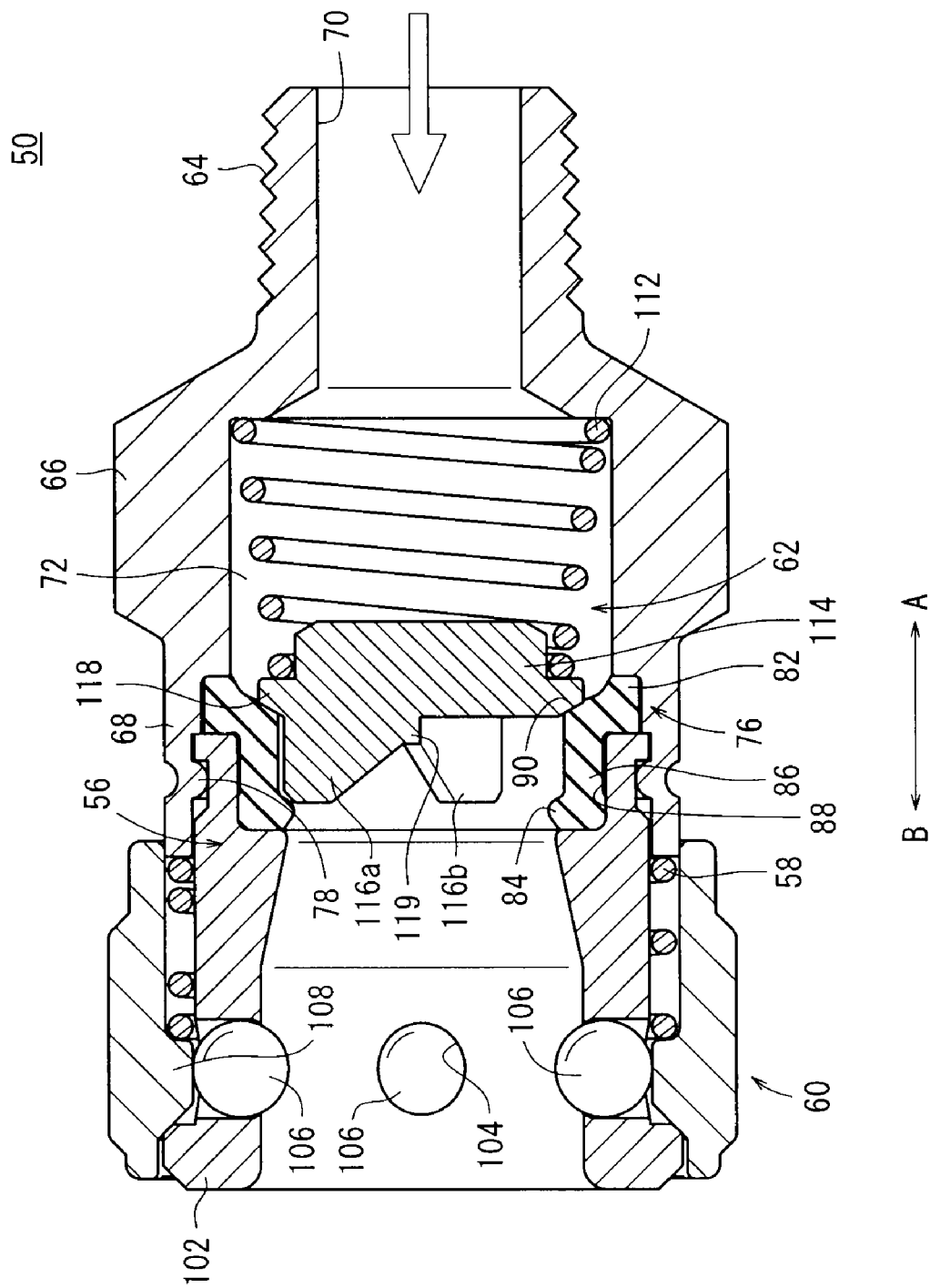
FIG. 5 is a vertical cross sectional view showing a state in which a plug is detached from the pipe joint of FIG. 1.
Figure 6:
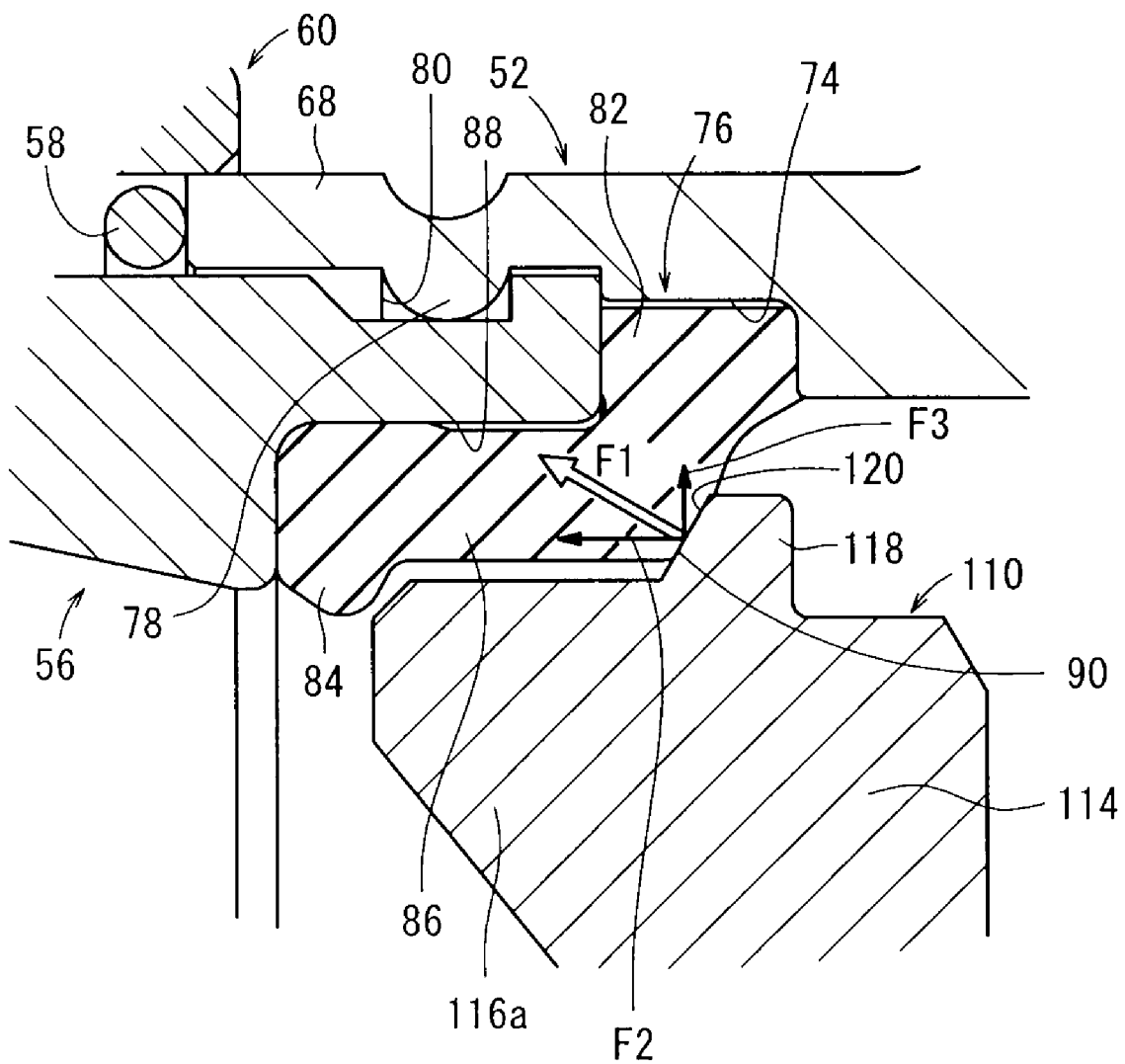
FIG. 6 is an enlarged cross sectional view showing the vicinity of a valve and packing in the pipe joint shown in FIG. 5.
Figure 7:
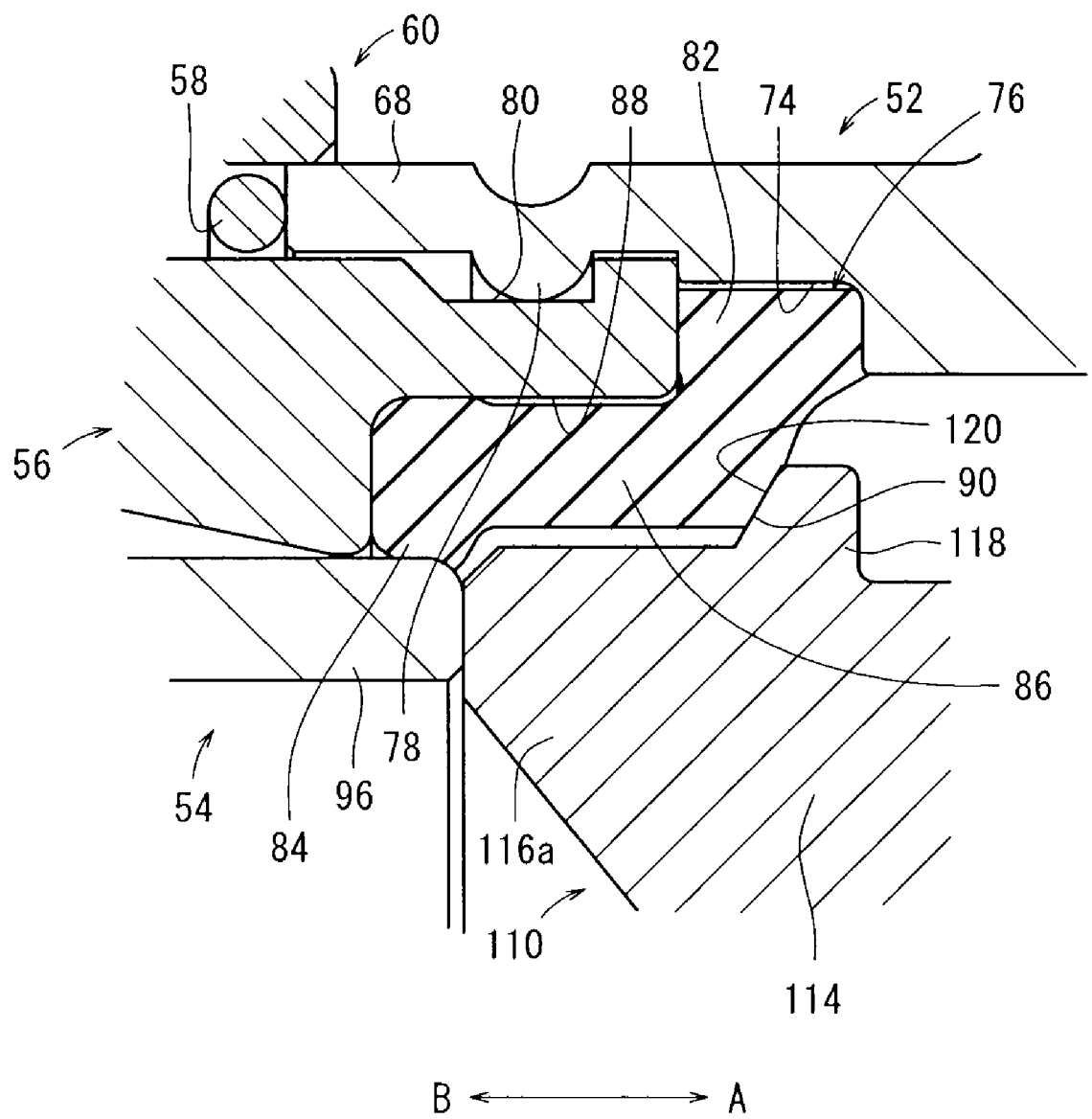
FIG. 7 is an enlarged cross sectional view of the vicinity of the valve and packing, showing a condition during installation of the plug with respect to the pipe joint of FIG. 5.

As shown in FIGS. 5 and 6, in the initial condition of the pipe joint 50, the valve 110 is pressed toward the side of the holder 56 (in the direction of the arrow B) under the elasticity of the valve spring 112, whereupon the seal member 118 abuts against the seating surface 90 of the packing 76 through the tapered surface 120. Further, the sleeve 60 is urged in a direction away from the socket 52 (the direction of the arrow B) under the elasticity of the return spring 58, and the projecting portion 108 of the sleeve 60 abuts against the outer circumferential surface of the balls 106 installed in the holder 56. Owing thereto, the plural balls 106 are pressed respectively toward the inner circumferential side of the holder 56, and portions of the balls 106 are exposed at the interior of the holder 56.

In such an initial state, the plug 54 is installed from the other end side of the holder 56 with respect to the pipe joint 50. In this case, first, after the sleeve 60 has been slid toward the side of the socket 52 (in the direction of the arrow A) in opposition to the elastic force of the return spring 58, the plug 54 is inserted into the holder 56 from the insert 96 side thereof.

In addition, by pressing of the plug 54 into the socket 52 (in the direction of the arrow A), the plug sealing portion 84 of the packing 76 slidably contacts the outer circumferential surface of the insert 96, so that a fluidtight condition is maintained between the plug 54 and the holder 56. Thereafter, the end of the insert 96 abuts against the legs 116a to 116c of the valve 110, and through the legs 116a to 116c, the valve 110 is pressed toward the port 70 side (in the direction of the arrow A) of the socket 52.

As a result thereof, the valve 110 is displaced in opposition to the elastic force of the valve spring 112, and the seat member 118 making up the valve 110 separates away from the seating surface 90 of the packing 76, whereupon the space 72 of the socket 52 and the through hole 100 of the plug 54 are placed in a state of communication.

In greater detail, the pressure fluid, which is introduced to the space 72 through the port 70, flows toward the side of the plug 54 through the intervals between the plural legs 116a to 116c that constitute the valve 110, and via the through hole 100 of the plug 54, the pressure fluid flows to a non-illustrated pipe or the like connected to the plug 54. At this time, before the valve 110 separates from the seating surface 90 of the packing 76, because the outer circumferential surface of the plug 54 is surrounded ahead of time by the plug sealing portion 84, the pressure fluid that is made to flow by opening the valve 110 is prevented from leaking to the outside from between the plug 54 and the holder 56.

Further, by releasing the retained state of the sleeve 60, the sleeve 60 is displaced toward the plug 54 (in the direction of the arrow B) by the elastic force of the return spring 58, whereupon the plural balls 106 are pressed toward the inner circumferential side of the holder 56 by the projecting portion 108 of the sleeve 60. In addition, the balls 106 are inserted into the ball groove 98 provided on the outer circumferential surface of the plug 54. Owing thereto, displacement of the plug 54 along the axial direction with respect to the socket 52 including the holder 56 is regulated, resulting in a state in which the plug 54 is connected with respect to the socket 52 (see FIG. 1).

At this time, because the plug sealing portion 84 that makes up the packing 76 abuts against the outer circumferential surface of the insert 96, leakage of pressure fluid from between the insert 96 and the packing 76 does not occur, and together therewith, leakage of the pressure fluid from between the inner wall surface of the socket 52 and the end of the holder 56 is prevented by the valve sealing portion 86.

On the other hand, in the case that the plug 54 is to be pulled out from the pipe joint 50 in which the aforementioned socket 52 and plug 54 have been connected, after the sleeve 60 is once again slid and displaced toward the side of the socket 52 (in the direction of the arrow A) in opposition to the elastic force of the return spring 58, the plug 54 is pulled (in the direction of the arrow B) so as to separate away from the socket 52. As a result thereof, the balls 106 that were inserted into the ball groove 98 of the plug 54 are pressed radially outward along the ball holes 104, whereupon the displacement regulated state in the axial direction of the plug 54 by the balls 106 is released. Further, at the same time, because a pressing force to the valve 110 is lowered, the valve 110 is pressed toward the side of the plug 54 (in the direction of the arrow B) by the elastic force of the valve spring 112.

Additionally, by further moving the plug 54 in a direction away from the socket 52 (in the direction of the arrow B), the seat member 118 of the valve 110 abuts against the seating surface 90 of the packing 76, thereby interrupting communication between the space 72 of the socket 52 and the interior of the holder 56. As a result, in the case that the plug 54 is separated from the socket 52 as well, the pressure fluid supplied to the space 72 of the socket 52 is retained and does not leak to the outside.

At this time, because the seat member 118 includes the tapered surface 120, which is inclined at a predetermined angle with respect to the axis of the valve 110, as shown in FIG. 6, the seating force when the seat member 118 abuts against the seating surface 90 can be suitably distributed over a first component force F1 that acts in a perpendicular direction with respect to the seating surface 90, a second component force F2 that works in a direction substantially parallel to the axis of the valve 110, and a third component force F3 that acts in a direction substantially perpendicular to the axis of the valve 110.

In the forgoing manner, according to the first embodiment of the invention, a cylindrically shaped packing 76 made from an elastic material is equipped with a body sealing portion 82 disposed on an outer circumferential side thereof and retained between the socket 52 and the holder 56, a plug sealing portion 84 disposed on an inner circumferential side thereof and capable of abutment against an outer circumferential surface of the plug 54, and a valve sealing portion 86 disposed between the body sealing portion 82 and the plug sealing portion 84 and having a seating surface 90 upon which the valve 110 can be seated. More specifically, by means of a single packing 76, leakage of pressure fluid existing between the holder 56 and socket 52 and the plug 54 is prevented, and further, while leakage of the pressure fluid from between the socket 52 and the holder 56 is prevented, when the valve 110 is seated on the valve sealing portion 86, leakage of pressure fluid from between the valve 110 and the valve sealing portion 86 can be prevented.

Accordingly, compared to a conventional pipe joint having respective sealing members disposed at each region, the number of parts constituting the pipe joint 50 can be reduced, along with reducing the number of assembly steps thereof as well as cost.

Further, when the plug 54 is detached from the socket 52, because a condition of communication can be established only after a fluidtight condition has been retained between the plug 54 and the socket 52, leakage of pressure fluid can be reliably prevented, thus enabling the pressure fluid to flow more effectively through the pipe joint 50.

Furthermore, when the socket 52 and plug 54 are connected, the plug sealing portion 84 provided on the inner circumferential side of the packing 76 abuts with and surrounds the outer circumferential surface of the plug 54, whereby fluidtightness can be retained reliably between the plug 54 and the holder 56 that holds the plug 54 therein. Specifically, since the amount of deformation (squeezing amount) of the plug sealing portion 84 upon sealing of the plug 54 can be reduced, the resistance encountered when the plug 54 is inserted into the socket 52 also becomes smaller. As a result, a large force is not required when the plug 54 is installed, and the attachment/detachment operation of the plug 54 can be carried out more easily.

Still further, by providing a tapered shape, which is inclined at a predetermined angle with respect to the axis of the packing 76, for the seat member 118 on which the valve 110 is seated, since the sealing force from the valve 110 imposed on the sealing surface 90 can be suitably distributed, strength and pressure resistance can be improved.

In addition, because the valve 110 is constructed with a plurality of legs 116a to 116c, which are separated by equal intervals on an end surface of the main body part 114 facing the plug 54, when the seat member 118 of the valve 110 is separated from the seating surface 90 and pressure fluid is allowed to flow, the valve 110 does not obstruct or hinder the flow passage for the pressure fluid, and the pressure fluid can be made to flow suitably while passing between the legs 116a to 116c. As a result, pressure loss of the pressure fluid within the pipe joint 50 can be suppressed, the pressure fluid can be made to flow effectively, and an energy savings effect can be obtained.

Figure 8:
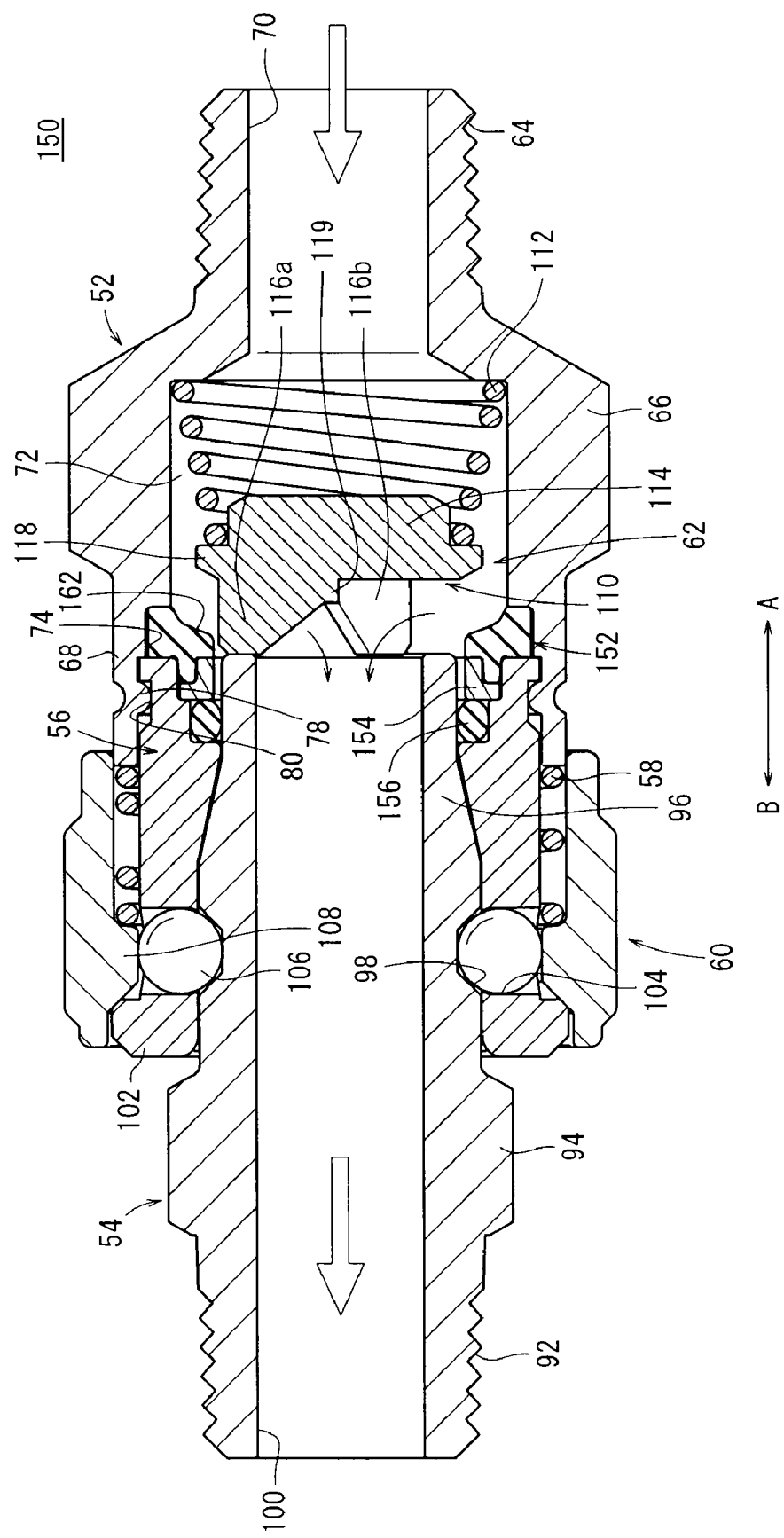
FIG. 8 is an overall vertical cross sectional view of a pipe joint according to a second embodiment of the present invention.
Figure 9:
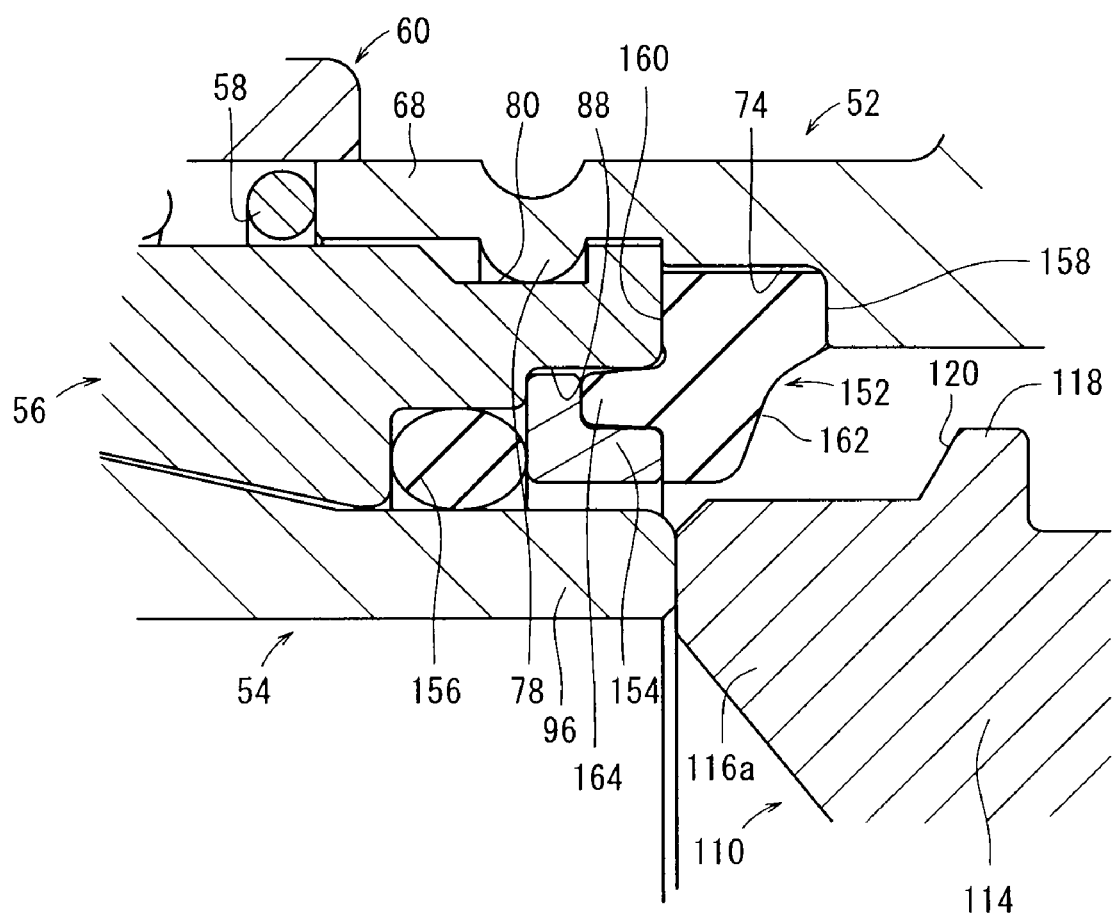
FIG. 9 is an enlarged cross sectional view showing the vicinity of a valve and packing in the pipe joint shown in FIG. 8.
Figure 10:
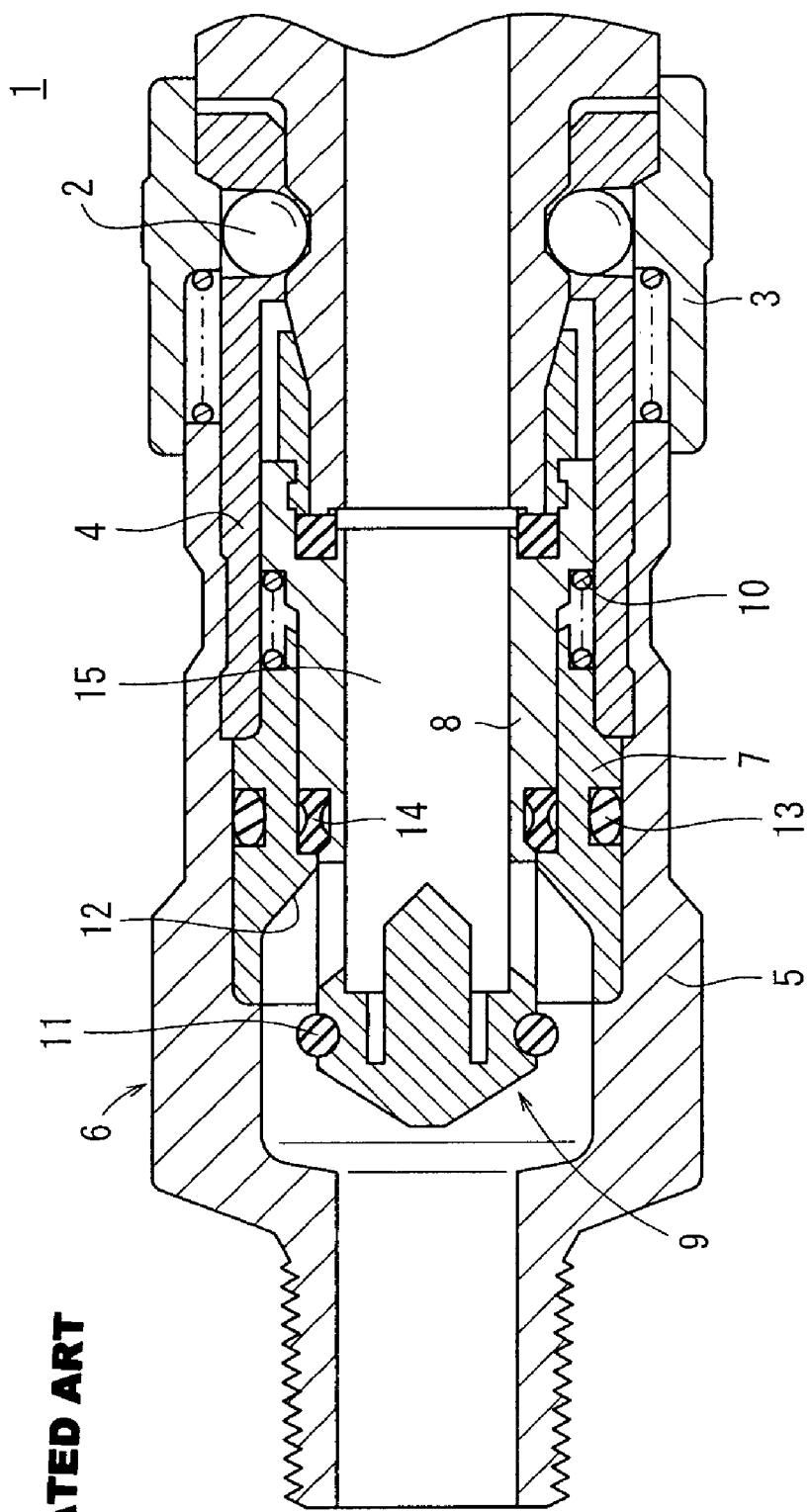
FIG. 10 is an overall cross sectional view of a pipe joint according to a conventional technique.
Figure 11A:
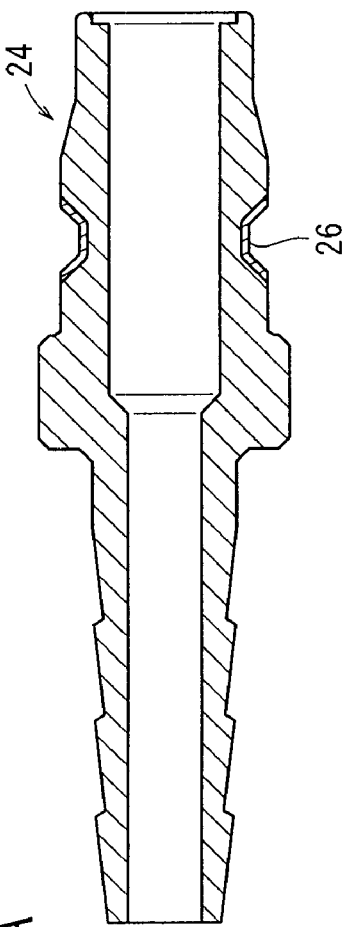
FIG. 11A is a cross sectional view showing a plug of a pipe joint according to another conventional technique.
Figure 11B:
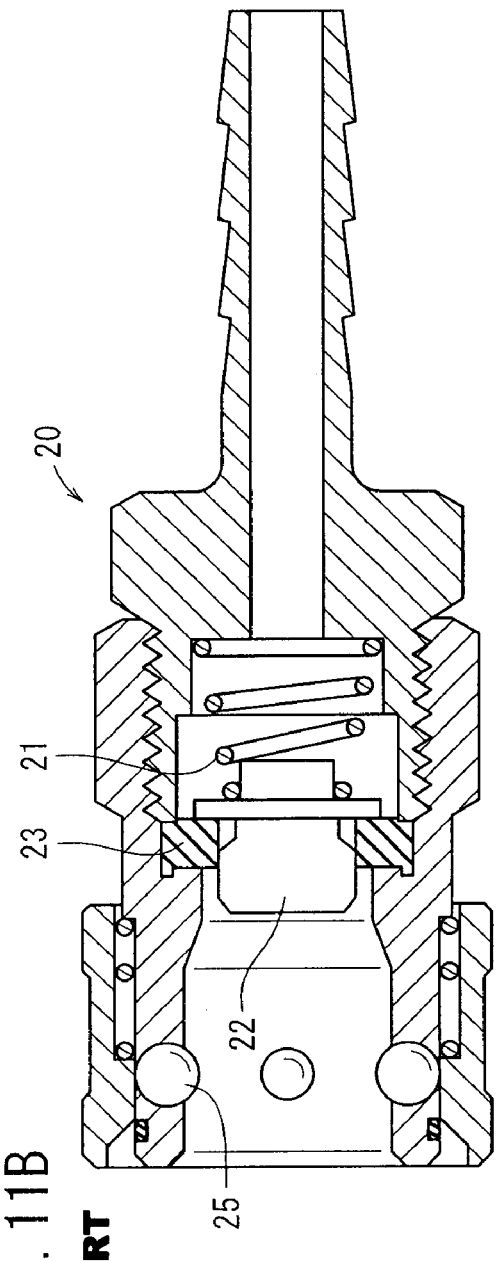
FIG. 11B is a cross sectional view of a socket to which the plug shown in FIG. 11A is connected.

Next, a pipe joint 150 according to a second embodiment of the invention is shown in FIGS. 8 and 9. Structural elements thereof, which are the same as those in the pipe joint 50 according to the above-described first embodiment, are designated using the same reference numerals, and detailed explanations of such features shall be omitted.

The pipe joint 150 according to the second embodiment differs from the pipe joint 50 of the first embodiment in that, in place of the single packing 76, a structure, which is capable of maintaining fluidtightness between the socket 52, the holder 56 and the plug 54, is made up of a body packing 152, a ring body 154, and an o-ring 156.

The pipe joint 150 comprises the body packing 152, which is retained on the stepped portion 74 of the socket 52. The body packing 152 is made, for example, from an elastic material such as rubber or the like, and is formed in a ring-like shape with a substantially triangular shape in cross section.

The body packing 152 includes a first abutment portion 158 that abuts against the socket 52, a second abutment portion 160 that abuts against the holder 56, a seat portion 162 on which the valve 110 is seated and which expands in a radially inward direction from the first and second abutment portions 158 and 160, and a protrusion 164 that projects in a direction away from the seat portion 162. The protrusion 164 projects toward the side of the plug 54 (in the direction of the arrow B), and is capable of sliding along an inner circumferential surface of the holder 56.

The first and second abutment portions 158, 160 are disposed on an outer circumferential region of the body packing 152, and are sandwiched and gripped between the stepped portion 74 of the socket 52 and the holder 56.

The seat portion 162 is recessed in a circular arc shape in cross section, and is formed so as to enable the seat member 118 of the valve 110 to be seated thereon.

The ring body 154 is made, for example, from a metal material and is formed with an L-shape in cross section. The ring body 154 engages with the protrusion 164 of the body packing 152. Owing to this structure, the inner circumferential surface of the ring body 154 and the inner circumferential surface of the body packing 152 are formed substantially along the same surface.

The o-ring 156 is formed from an elastic material such as rubber or the like and is retained on an inner circumferential surface of the holder 56, while also being sandwiched between the ring body 154 and supported along the axial direction (the direction of arrows A and B) of the pipe joint 150.

More specifically, by providing the metallic ring body 154, which functions as a seal for the pipe joint 150, between the body packing 152 and the o-ring 156, deformation of the body packing 152 and the o-ring 156 can be suppressed. Stated otherwise, the ring body 154 functions as a deformation preventing mechanism, which is capable of suppressing elastic deformation of the body packing 152 and the o-ring 156.

As a result, fluidtightness between the socket 52 and the holder 56 is reliably maintained by the body packing 152 whereby a desired sealing function can be obtained, and together therewith, fluidtightness between the holder 56 and the plug 54 is maintained reliably by the o-ring 156, thus enabling the desired sealing function to be obtained.

The pipe joint according to the present invention is not limited to the aforementioned embodiments. It is a matter of course that various other structures could be adopted without deviating from the essential nature and gist of the present invention.

What is claimed is:

1. A pipe joint comprising:
a first joint member;
a holder connected integrally with the first joint member;
a second joint member, which is connectably and detachably installed in an interior of the holder;
a valve mechanism disposed in an interior of the first joint member, the valve mechanism enabling switching of a flow state of a pressure fluid that flows between the first joint member and the second joint member; and
a seal member having a first sealing portion retained between the first joint member and the holder, a second sealing portion which abuts against the second joint member, and a third sealing portion on which a valve body of the valve mechanism is seatable, wherein
the first, second, and third sealing portions are integral with each other, and
the third sealing portion is in between the first and second sealing portions along an axial direction of the pipe joint, wherein the first sealing portion and the third sealing portions form a L-shape.

2. The pipe joint of claim 1, wherein the valve body comprises:
a seat member disposed displaceably along the axial direction in the interior of the first joint member, the seat member being seatable on the third sealing portion; and
a plurality of legs facing the second joint member and projecting toward a side of the second joint member, wherein on the seat member, one side surface thereof that abuts against the third sealing portion is tapered and inclined at a predetermined angle with respect to an axis of the valve body.

3. The pipe joint of claim 1, wherein on the seat member, an abutment surface that abuts against the third sealing portion is tapered and inclined at a predetermined angle with respect to an axis of the valve body, and the third sealing portion includes a tapered seating surface corresponding to the seat member, which is inclined at a predetermined angle with respect to an axis of the seal member.

4. The pipe joint of claim 3, wherein the second sealing portion is formed in an annular shape and abuts against an outer circumferential surface of the second joint member.

5. The pipe joint of claim 2, wherein the legs extend radially outward from a center of the valve body and are separated mutually by equal angular intervals in a circumferential direction.

6. The pipe joint of claim 2, wherein a spring is interposed between the valve body and the first joint member for urging the valve body toward the side of the second joint member.

7. The pipe joint of claim 6, wherein the seat member projects radially outward from an outer circumferential surface of the valve body, wherein another side surface opposite to the one side surface of the seat member retains an end of the spring.

8. The pipe joint of claim 1, wherein the first and second sealing portions are orthogonal to the third portion and extend in opposite directions as each other relative to the axial direction of the pipe joint.

9. The pipe joint of claim 1, wherein the third sealing portion has a substantially constant diameter in the axial direction of the pipe joint.

* * * * *